United States Patent
Iijima et al.

[11] Patent Number: 6,059,186
[45] Date of Patent: May 9, 2000

[54] DIGITAL CASH SAFE AND A METHOD FOR TRANSFERRING A MONETARY VALUE THEREFROM AND THERETO

[75] Inventors: Teruo Iijima; Hidehito Jinnai; Kazuaki Ebara, all of Tokyo, Japan

[73] Assignee: Oki Electric Industry Co., Ltd., Tokyo, Japan

[21] Appl. No.: 09/048,228

[22] Filed: Mar. 26, 1998

[30] Foreign Application Priority Data

Mar. 28, 1997 [JP] Japan ................................. 9-078017

[51] Int. Cl.⁷ .......................................... G06F 17/60
[52] U.S. Cl. .................. 235/379; 235/441; 235/381; 235/479; 902/26; 902/22; 902/41; 380/24; 380/25
[58] Field of Search ........................ 235/441, 381, 235/379, 479, 486, 483, 383; 902/26, 22, 41; 380/24, 25

[56] References Cited

U.S. PATENT DOCUMENTS

| | | | |
|---|---|---|---|
| 4,503,498 | 3/1985 | Antonove et al. | 364/200 |
| 4,877,947 | 10/1989 | Mori | 235/381 |
| 4,947,766 | 8/1990 | Colier, Jr. | 109/56 |
| 5,148,432 | 9/1992 | Gordon et al. | 371/10.1 |
| 5,231,274 | 7/1993 | Reynier | 235/441 |
| 5,483,419 | 1/1996 | Kaczeus, Sr. et al. | 361/685 |
| 5,586,250 | 12/1996 | Carbonneau et al. | 395/183.2 |
| 5,701,828 | 6/1996 | Benore et al. | 109/56 |
| 5,718,609 | 2/1998 | Braun et al. | 439/630 |
| 5,754,518 | 9/1996 | Dang et al. | 369/191 |
| 5,835,700 | 11/1998 | Carbonneau et al. | 395/183.2 |
| 5,867,579 | 2/1999 | Saito | 380/25 |

OTHER PUBLICATIONS

Nikkan Kougyou Shinbunsya, "Electronic Money", Jun. 1996, pp. 153–154.

*Primary Examiner*—Thien M. Le
*Assistant Examiner*—Daniel S. Felten
*Attorney, Agent, or Firm*—Venable; Robert J. Frank

[57] ABSTRACT

A digital cash safe for storing a monetary value corresponding to an amount of digital cash. The digital cash safe includes a circuit board on which a plurality of storage devices are mounted each of the storage device storing a monetary value and a controller to select one of the storage devices and transfer a monetary value from or into the selected storage device. The circuit board and the controller are secured by a case having a door and a door lock for controlling access thereto.

6 Claims, 4 Drawing Sheets

DIGITAL CASH SAFE AND A METHOD FOR TRANSFERRING A MONETARY VALUE THEREFROM AND THERETO

BACKGROUND OF THE INVENTION

This invention relates to a digital cash safe used in- an electronic transaction system for transferring digital cash to a memory device provided by a payee from a card owned by a payer.

An electronic transaction system using a prepaid microchip card is disclosed in U.S. Pat. No. 4,877,947. The patented system employs a customer's microchip card in which the customer's monetary value is digitally stored. A vendor's microchip card is also provided in which the vendor's monetary value is digitally stored. When a purchase is made, the customer inserts his card in a customer's microchip card reader/writer. The vendor inserts bis microchip card in a vendor's microchip card reader/writer and enters the amount of the purchase on a keypad connected to the vendor's microchip card reader/writer. The amount of the purchase is communicated from the vendor's microchip card reader/writer to the customer's microchip card reader/writer, and then from the two microchip card reader/writers to both microchip cards. With suitable verifications, the amount of the purchase is deducted from the balance recorded in the customer's microchip card and added to the balance recorded in the vendor's microchip card.

Electronic transaction systems have many advantages over cash payment systems. However, a problem faced by large commercial facilities such as department stores and banks is that they must frequently carry out simultaneously a plurality of transactions using digital cash. Consequently, it is necessary to prepare in advance a plurality of microchip cards which require a relatively large amount of space for storage. To solve this problem, our invention provides an electronic transaction system which permits the efficient and secure storage of many microchip cards in a limited space, and which may be used for carrying out a plurality of transactions at the same time.

SUMMARY OF THE INVENTION

Accordingly, it is an object of the present invention to provide a digital cash safe containing a plurality of storage devices for executing a plurality of transactions at the same time.

Another object of the present invention is to provide a digital cash safe in which storage devices can be easily installed, and which are protected from removal therefrom by an unauthorized person.

The present invention is a digital cash safe for storing monetary values; each corresponding to an amount of digital cash. The digital cash safe includes a circuit board on which a plurality of storage devices are mounted, each of said storage devices storing a monetary value, and a controller for selecting one of the storage devices and transferring a monetary value from the selected storage or into a selected storage device. The circuit board and the controller are secured by a case having a door and a door lock means for controlling access to the board and controller.

BRIEF DESCRIPTION OF THE DRAWINGS

The present invention is illustrated in the following drawing in which.

DETAILED DESCRIPTION OF THE PREFERRED EMBODIMENTS

The invention will be described in further detail by way of example with reference to the accompanying drawings.

Figure 1:
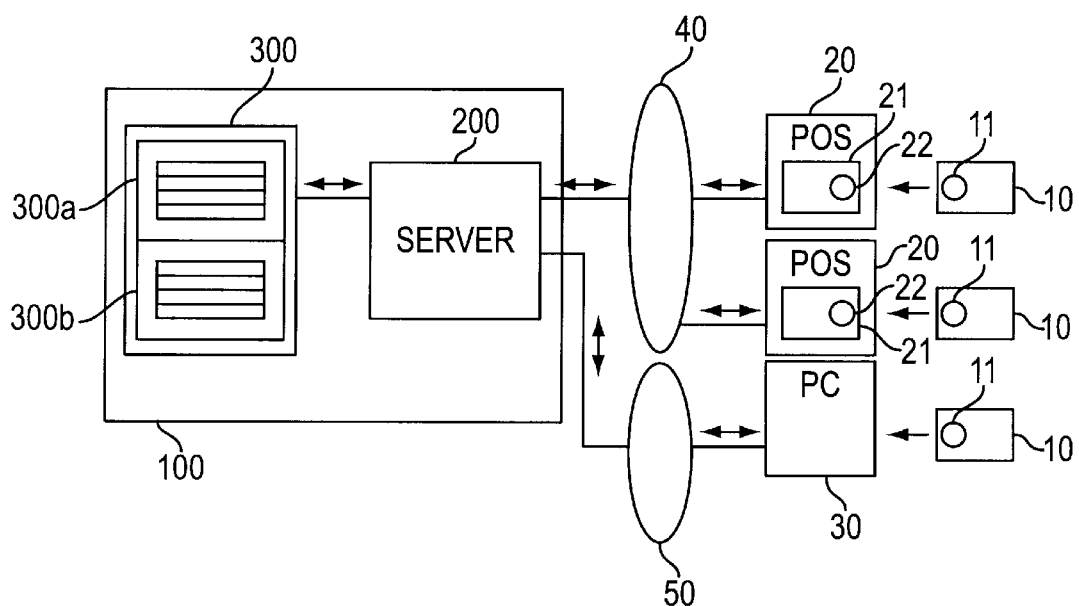
FIG. 1 is a block diagram of an electronic transaction system of the present invention.

The drawings show a preferred embodiment of an electronic transaction system for executing an electronic transaction between a payer and a payee. A customer's card 10 (FIG. 4A), which is of the type known as a smart card and is owned by a customer, includes an integrated circuit hereinafter IC) 11 for digitally storing a monetary value as digital cash. Referring to FIG. 1, an electronic transaction is carried out by inserting the customer's card 10 into a digital cash input means or point-of-sale (POS) terminal 20 located in a retail store. A retailer's card 21, owned by the retailer, is provided in a POS terminal 20. The retailers card 21, which houses an IC 22 having the same size as the IC 11 in the customer's card, stores digitally a monetary value as digital cash.

The POS terminal 20 is connected to a server 200, that controls a digital cash safe 300, through a transmission line 40 which may be a dedicated line or a public telephone line. The server 200 and the digital cash safe 300 are located at a money control center 100 established in a main branch of the retail store or in a bank.

An electronic transaction may also be carried out by inserting the customer's card 10 into a computer 30 which is connected to the server 200 by an internet connection 50. Thus, a customer may execute an electronic transaction via the internet by using the internet connection 50 and his personal computer 30 to connect his customer's card 10 to the server 200.

Figure 2:
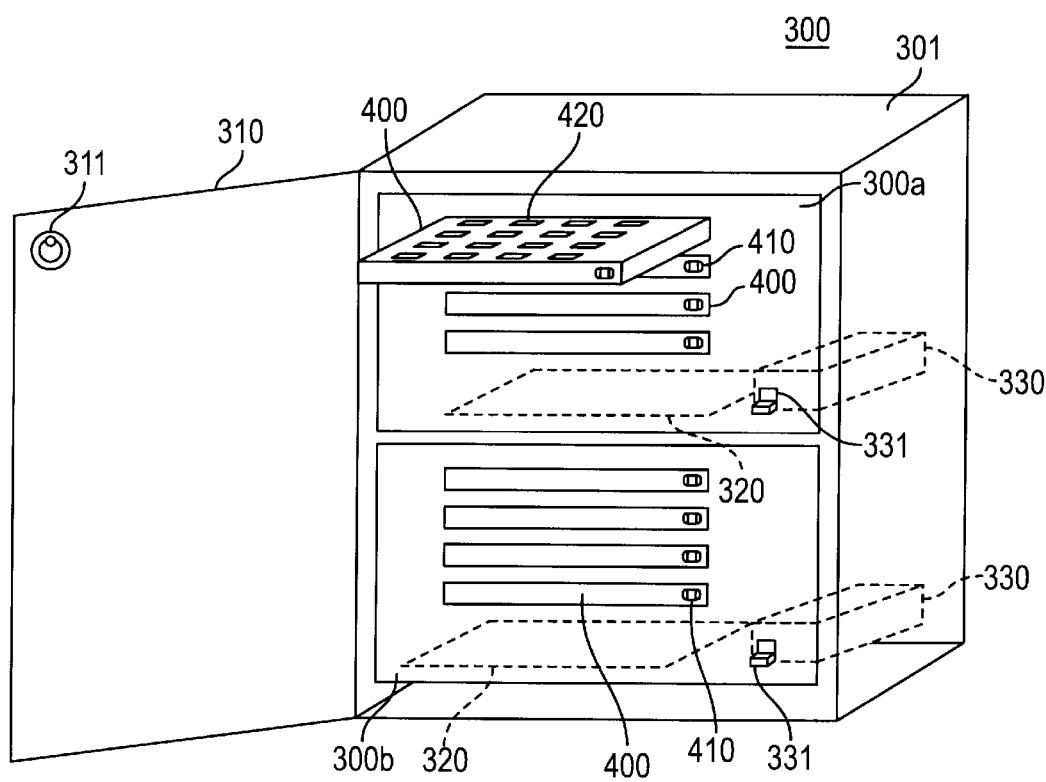
FIG. 2 is a perspective diagram of a digital cash safe comprising part of the electronic transaction system of FIG. 1.
Figure 3:
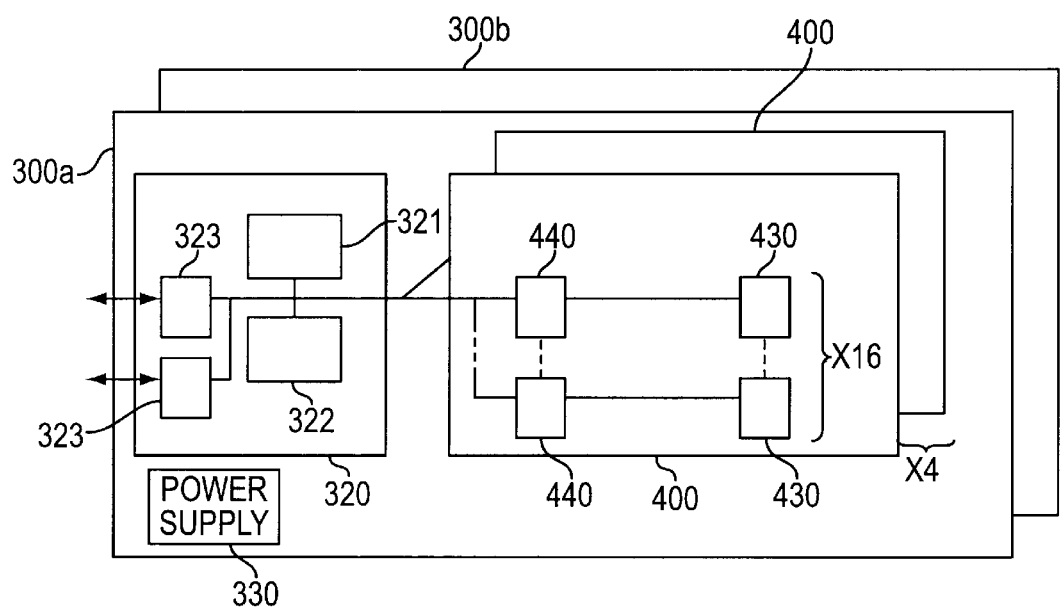
FIG. 3 is a block schematic diagram of a part of the digital cash safe shown in FIG. 2.

As shown in FIG. 2, the digital cash safe 300, which consists of a case 301 supporting rotatably a door 310 having a door lock 311, houses a plurality of circuit boards 400 each having a board lock 410. Each of the circuit boards 400 may be inserted at any time in the digital cash safe 300. However, a circuit board 400 can be withdrawn from the digital cash safe only when its board lock 410 is opened.

The digital cash safe 300 is divided into an upper unit 300a and a lower unit 300b, the upper and lower units having identical configurations. In this example, four. circuit boards 400 are provided in the upper unit 300a and four circuit boards are provided in the lower unit 300b. A plurality of SIM cards 420 (FIG. 4B), each having an IC 421 which is the same size as the IC 11 on the customer's card 10, are provided. The SIM cards 420, which store digitally monetary values as digital cash, are arranged in a square matrix on each of the circuit boards 400. It will be understood that, although FIG. 2 shows sixteen SIM cards 420 arranged in four lines and rows on one circuit board 400, the number and arrangement of SIM cards 420 is not limited to this embodiment. Since each of the circuit boards 400 has a lock 410 and the digital cash safe has a lock 311, reliable protection against theft is afforded to the SIM cards 420.

Referring to FIGS. 2, 3, 4B and 5, each SIM card 420 is installed in a SIM socket 430 on a circuit board 400, and is connected electrically to a controller 320 through its respective socket 430 and a parallel port 440 also mounted on the circuit board 400. The controller 320 and the parallel port 440 are provided for each of the upper and lower units 300*a* and 300*b* respectively of the digital cash safe 300. Each controller 320, which is energized by a power supply 330 when a switch 331 associated with the power supply is turned on, comprises interfaces 323 and a micro-processor 321 for controlling a memory 322 and the parallel ports 440. The memory 322 stores processing programs that include software for the control of communications and various command processing functions. The microprocessor 321 is connected to the server 200 through one of the interfaces 323, the other interface 323 being provided as a spare.

Figure 4B:
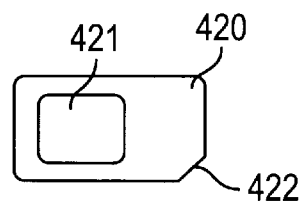
FIG. 4B is a top view of a subscriber id entity module card (hereinafter SIM card ) used in the electronic transaction system of FIG. 1.
Figure 4A:
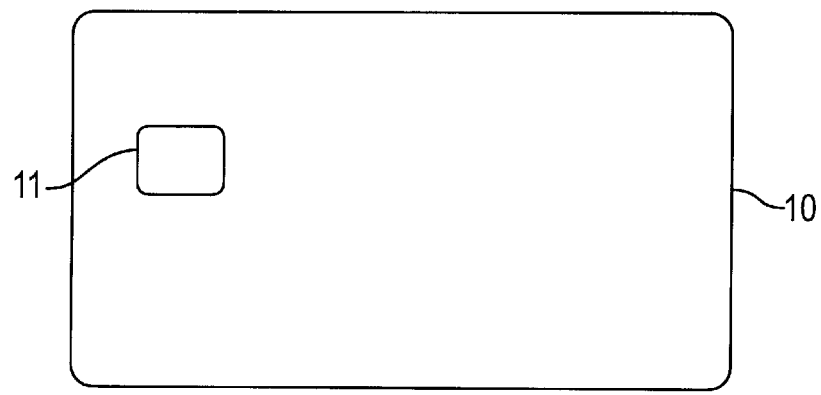
FIG. 4A is a top view of a customer's card.

Referring to FIGS. 4A and 4B, it is seen that the SIM card 420, which has a corner 422 cut off diagonally, is considerably smaller than the customer's card 10. The IC 421 is almost as large as the SIM card 420 and therefore it is possible to position a relatively large number of SIM cards 420 on each circuit board 400.

Figure 5:
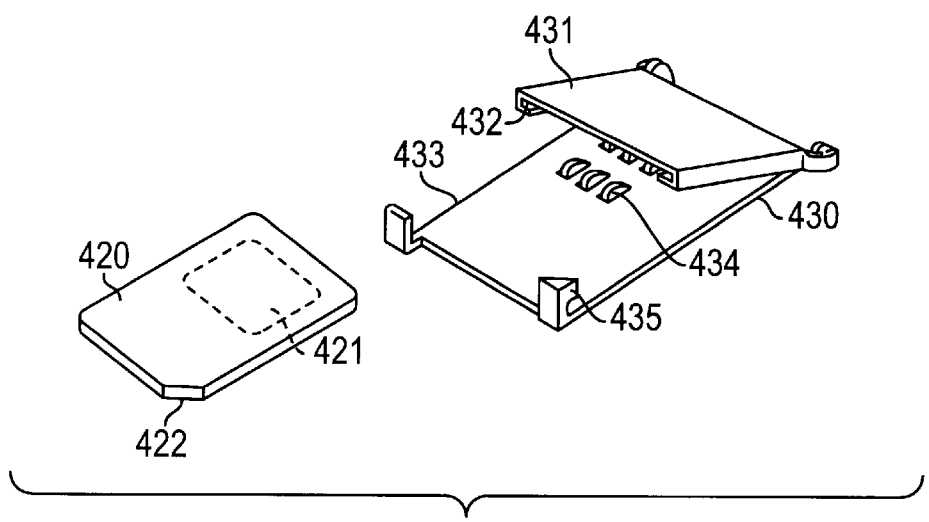
FIG. 5 is a perspective diagram of a socket for receiving the SIM card shown in FIG. 4B.

Referring to FIG. 5, there is shown a SIM socket 430 for installing a SIM card 420. The SIM socket 430 consists of a base 433 fixed to a circuit board 400 and a cover 431 supported rotatably on the base. The base 433 has contacts 434 for connecting electrically to the IC 421 of the SIM card 420, and a protuberance 435 corresponding to the corner 422 of the SIM card in order to assure that the SIM card is not inserted in the SIM socket 430 in the wrong direction which could result in its destruction. In addition, guides 432, formed on both sides of the cover 431, are provided to hold the SIM card 420. The SIM card 420 is fixed to the SIM socket 430 by closing the cover 431 after it has been inserted along the guides 432. Further, contacts (not shown) forming part of the IC 421 are connected electrically to contacts 434 on the base 433 when the cover 431 is closed.

Next, an electronic transaction executed by the electronic transaction system of the present invention is explained. When a purchase is made by a customer, the customer hands his customer's card 10 to the retailer who inserts it in the POS terminal 20 where the amount of the purchase is transferred from the customer's card 10 to the retailer's card 21. In the POS terminal 20, the amount of the purchase is deducted from the balance stored in the customer's card 10 and is added to the balance stored in the retailers card 21.

When the retailer deposits the proceeds of his sales in the bank or transmits them to the main branch of the store, digital cash stored in the retailer's card 21 is transferred to the server 200 from the card 21 through the POS terminal 20 and transmission line 40. Thus, in this case, the retailer is the payer and the main branch or the bank is the payee. The digital cash transferred from the retailer's card 21 is temporarily stored in the server 200 and then transferred by the micro-processor 321, in accordance with the command of the server 200, via one of the controllers 320 to a SIM card 420 provided in the digital cash safe 300. Since a plurality of SIM cards 420 are connected to the controllers 320 in parallel through parallel ports 440, the digital cash transferred from many POS terminals 20 through the line 40 can be stored simultaneously in each SIM card 420.

The number of SIM cards 420 installed in the digital cash safe 300 depends on the size of the store. For example, a large store having many POS terminals 20 would have a correspondingly large number of SIM cards for the exclusive use of the large store, and a small store having only a single POS terminal 20 might have only one SIM card for the exclusive use of-the small store. Also, each SIM card 420 in the digital cash safe 300 at a large store is assigned a priority for access by the server 200. Thus, if digital cash is transferred to the server 200 from two POS terminal 20 in a store simultaneously, the server transfers the digital cash from one of the POS terminals 20 to the SIM card 420 having the highest priority and the digital cash transferred from the other POS terminal 20 is stored in the STM card 420 having the next highest priority. Further, when digital cash is transferred from different stores simultaneously, the server 200 stores each amount of digital cash in the SIM card 420 assigned to the store from which it is transferred.

When the retailer or customer operates the POS terminal 20 or PC 30 to draw out digital cash, digital cash stored in the SIM card 420 is transferred to the retailer's card 21 or the customer's card 10 through the line 40 or the internet 50 respectively. Thus, the retailer and customer can draw digital cash from a SIM card 420. The number of retailer's cards 21 accommodated simultaneously by the digital cash safe 300 can be increased by increasing the number of SIM cards 420 in the digital cash safe 300.

When the customer pays the amount of the purchase by using a personal computer 30, he connects his customer's card 10 to the personal computer 30 which is coupled to the server 200 through the internet 50 and the desired operation is executed. In this case, the customer is a payer and the store owning the server is payee. Digital cash equal to the amount of the purchase is transferred to the server 200 from the customer's card 10 and the server 200 stores the digital cash in a SIM card 420 provided in the digital cash safe 300.

Since the SIM cards 420 are arranged in a matrix on each circuit board 400, which in the disclosed example is square, and are smaller than the customer's card 10, a plurality of SIM cards 420 can be placed on each circuit board 400. Therefore, the electronic transaction system can handle simultaneously digital cash transferred from cards owned by a plurality of payers. In addition, each SIM card 420 can be inserted in and withdrawn from each SIM socket 430 easily and individually.

While the invention has been particularly shown and described with reference to preferred embodiments thereof, it will be understood by those skilled in the art that the foregoing and other changes in form and details can be made therein without departing from the sprit and scope of the invention. For example, although the digital cash safe is established in a store in this embodiment, it may be established in a bank.

We claim:

1. A method for transferring a monetary value into a digital cash safe, comprising the steps of providing a digital cash safe, said digital cash safe having
a circuit board on which a plurality of storage devices are mounted, each of said storage devices storing a monetary value;
a controller for selecting one of the storage devices and transferring a monetary value from or into the selected storage device; and
a case securing the circuit board and the controller, each of the circuit boards being mounted and aligned with respect to each other to form a unit within the case, and each of said circuit boards being locked in the case by a circuit board locking means;

connecting said digital cash safe to a digital cash input means;

accepting a card in which a monetary value is stored within said digital cash input means;

recognizing a monetary value inputted into said digital cash input means; and transferring the monetary value stored in said card to said digital cash safe and storing it in a selected storage device.

2. A method for transferring a monetary value from a digital cash safe, comprising the steps of:

providing a digital cash safe, said digital cash safe having
- a circuit board on which a plurality of storage devices are mounted, each of said storage devices storing a monetary value;
- a controller for selecting one of the storage devices and transferring a monetary value from or into the selected storage device; and
- a case securing the circuit board and the controller, each of the circuit boards being mounted and aligned with respect to each other to form a unit within the case, and each of said circuit boards being locked in the case by a circuit board locking means;

connecting said digital cash safe to a digital cash input means;

accepting a card in which a monetary value can be stored within said digital cash input means;

recognizing a monetary value inputted into said digital cash input means; and transferring the monetary value stored in a selected storage device of said digital cash safe to said card and storing it in said card.

3. A digital cash safe for storing a monetary value, comprising:

a plurality of circuit boards on which a plurality of storage devices are mounted, said storage devices being electrically isolated from each other and arranged in a square matrix on each of the circuit boards, each of said storage devices storing a monetary value;

a controller, said controller selecting one of said storage devices and transferring a monetary value from or into the selected storage device; and a case securing said circuit boards and the controller, said circuit boards being mounted and aligned with respect to each other to form a unit within the case, and each of said circuit boards being locked in the case by a circuit board lock means.

4. A digital cash safe according to claim 3 wherein each of said storage devices is an SIM card.

5. A digital cash safe according to claim 4 wherein a circuit board lock means is located on a front end of each of said circuit boards.

6. A digital cash safe according to claim 4 wherein said case is divided into a plurality of said units, each of said units further including a controller.

* * * * *